US008903988B2

United States Patent
Di Donato et al.

(10) Patent No.: US 8,903,988 B2
(45) Date of Patent: Dec. 2, 2014

(54) ONE ACTIVITY REPORT FOR INTERCEPTION PURPOSES

(75) Inventors: Rita Di Donato, Cava de' Tirreni (IT); Raffaele De Santis, Mercato San Severino (IT); Roberto Cicco, Cava de Tirreni (IT); Luca Di Serio, Nocera Inferiore (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 703 days.

(21) Appl. No.: 12/936,257

(22) PCT Filed: Apr. 4, 2008

(86) PCT No.: PCT/SE2008/050391
§ 371 (c)(1),
(2), (4) Date: Oct. 4, 2010

(87) PCT Pub. No.: WO2009/123514
PCT Pub. Date: Oct. 8, 2009

(65) Prior Publication Data
US 2011/0032840 A1    Feb. 10, 2011

(51) Int. Cl.
*G06F 15/173* (2006.01)
*H04L 12/26* (2006.01)
*H04L 29/06* (2006.01)
*H04M 3/22* (2006.01)

(52) U.S. Cl.
CPC ............ *H04L 43/00* (2013.01); *H04L 12/2602* (2013.01); *H04M 2207/203* (2013.01); *H04L 63/00* (2013.01); *H04M 3/2281* (2013.01); *H04L 63/30* (2013.01)
USPC ........... 709/224; 370/310; 370/328; 370/329; 726/22; 726/23

(58) Field of Classification Search
USPC ........ 726/22–23; 709/224; 370/310, 328, 329
See application file for complete search history.

(56) References Cited

U.S. PATENT DOCUMENTS

| | | | |
|---|---|---|---|
| 2005/0210127 A1* | 9/2005 | Pohja et al. | 709/224 |
| 2006/0112429 A1* | 5/2006 | Polzer et al. | 726/22 |
| 2006/0128377 A1 | 6/2006 | Murhammer et al. | |
| 2011/0032840 A1* | 2/2011 | Di Donato et al. | 370/252 |

FOREIGN PATENT DOCUMENTS

WO   WO 2006/128495 A1   12/2006
WO   WO 2008/013482 A1   1/2008

OTHER PUBLICATIONS

Universal Mobile Telecommunications Systems (UMTS); 3G Security; Handover Interface for Lawful Interception (LI) (3GPP TS 33.108 v6.9.0 Release 6), ETSI TS 133 108 v6.9.0 (Jun. 2005).
Telecommunications Security; Lawful Interception (LI); Part 2: Requirements of Law Enforcement Agencies for Circuit Switched Oriented Telecommunications Networks and Services. Draft TR 101 331-2 v0.0.6 (Jul. 2000).

* cited by examiner

*Primary Examiner* — Hassan Kizou
*Assistant Examiner* — Ashil Farahmand

(57) ABSTRACT

The present invention relates to methods and arrangements for optimizing monitoring capacity in a telecommunication system comprising at least one information element receiving unit. One activity report request along with identities of a target to be monitored are received at the element receiving unit. At least two information elements belonging to a first element group, related to the specified target by different identities and comprise duplicate information are also received at the target. The element receiving unit selects one of the received at least two elements.

20 Claims, 8 Drawing Sheets

PRIOR ART

ONE ACTIVITY REPORT FOR INTERCEPTION PURPOSES

TECHNICAL FIELD

The present invention relates to methods and arrangements for optimizing monitoring capacity in a telecommunication system comprising at least one information receiving unit.

BACKGROUND

According to the 3GPP standard, a subscriber can be intercepted based on Mobile Station International ISDN Number MSISDN, International Mobile Subscriber Identity IMSI and International Mobile Equipment Identity IMEI. The target identities for 3GPP MS CS and GPRS interception at the SGSN, GGSN, 3G MSC Server and 3G GMSC Server can be at least one of the following: IMSI, MSISDN or IMEI.

FIG. 1 is part of the prior art and discloses an Intercept Mediation and Delivery Unit IMDU, also called Intercept Unit. The IMDU is a solution for monitoring of Interception Related Information IRI and Content of Communication CC for a target. The different parts used for interception are disclosed in current Lawful Interception standards (see 3GPP TS 33.108 and 3GPP TS 33.107—Release 7). A Law Enforcement Monitoring Facility LEMF is connected to Mediation Functions MF, MF2 and MF3 respectively for ADMF, DF2, DF3 i.e. an Administration Function ADMF and two Delivery Functions DF2 and DF3. The Administration Function and the Delivery Functions are each one connected to the LEMF via standardized handover interfaces HI1-HI3, and connected via interfaces X1_1, X2, X3 to an Intercepting Control Element ICE in a telecommunication system. Together with the delivery functions, the ADMF is used to hide from ICEs that there might be multiple activations by different Law Enforcement Agencies. Messages REQ sent from LEMF to ADMF via HI1 and from the ADMF to the network via the X1_1 interface comprise identities of a target that is requested to be monitored. The Delivery Function DF2 receives Intercept Related Information IRI from the network via the X2 interface. DF2 is used to distribute the IRI to relevant Law Enforcement Agencies via the HI2 interface. Intercept Related Information IRI, received by DF2 is triggered by Events that in Circuit Switching domain are either call related or non-call related. In Packet Switching domain the events are session related or session unrelated. The Delivery Function DF3 receives Content of Communication CC, i.e. speech and data, on X3 from the ICE. In Circuit Switching, DF3 is responsible for call control signaling and bearer transport for an intercepted product. Keeping focus on the scope of this proposal, impacted areas are the ICE, the interfaces X1_1, X2 and X3 and consequently the interfaces HI1, HI2 and HI3.

Requests are also sent from the ADMF to a Mediation Function MF2 in the DF2 on an interface X1_2. The requests sent on X1_2 are used for activation of Intercept Related Information IRI, and to specify detailed handling options for intercepted IRI. For the activation of Intercept Related Information IRI the message sent from the ADMF to the DF2 contains:

The target identity;
The address for delivery of IRI (=LEMF address);
Which subset of information shall be delivered;
A DF2 activation identity which uniquely identifies the activation for DF2 and is used for further interrogation or deactivation, respectively;
The IA in case of location dependent interception;
The warrant reference number if required by national option.

Intercept Related Information IRI events are necessary at the start and end of the call, for all supplementary services during a call and for information which is not call associated. There are call related events and non call related events. If an event for/from a mobile subscriber occurs, the ICE sends the relevant data to the DF2. A similar situation applies to the case of PS domain.

The Delivery Function DF3 receives Content of Communication CC, i.e. speech and data, on X3 from the ICE. Requests are also sent from the ADMF to a Mediation Function MF3 in the DF3 on an interface X1_3. The requests sent on X1_3 are used for activation of Content of Communication, and to specify detailed handling options for intercepted CC. In Circuit Switching, DF3 is responsible for call control signaling and bearer transport for an intercepted product.

The scenario for delivery of the Content of Communication CC is as follows. At call attempt initiation, for one 64 kbit/s bi-directional target call, two ISDN delivery calls are established from the DF3 to the LEMF. One call offers the Content of Communication CC towards the target identity (CC Rx call/channel), the other call offers the Content of Communication CC from the target identity (CC Tx call/channel). The above discussed scenario is called Stereo delivery. In case 'call from' and 'call to' monitored subscriber are mixed and delivered using one CC call/channel, it is called Mono delivery. The standard ETSI defines the following delivery types for Stereo delivery in case of multi party calls:

Stereo, Option A—Separate CC links for each call, active or not active. A network option allows switching to off or on the communication towards to the LEMF for the non-active call (i.e. to send or not the call contents of the held parties in multi party calls towards the LEMF).

Stereo, Option B—The CC links are only used for calls active in their communication phase (this option is also called "Reuse of CC links for active calls").

To assure correlation between the independently transmitted Content of Communication CC and Intercept Related Information IRI of an intercepted call the following parameters are used:

Lawful Interception IDentifier (LIID)
Communication IDentifier (CID)
CC Link IDentifier (CCLID)

These parameters are transferred from the DF2 and DF3 to the LEMF over HI2 and HI3 respectively.

As a normal behavior, a target subscriber is intercepted by a same Law Enforcement Agency LEA (for example national police) by ordering monitoring on all the target identity types (MSISDN, IMSI and IMEI) that could belong to the target subscriber. A reason is that a certain identity could be not available in a specific traffic case and the assumption is that all traffic events have to be monitored and sent to LEA. In addition, the target multiple identities are usually set on the whole network; as a consequence, the monitoring events are notified to LEA several times depending on the presence of multiple ICEs in the traffic chain.

By considering the above, in case a subscriber is intercepted by the same LEA for both Call Data and Call Content on several target identities (MSISDN, IMSI and IMEI) and in case the Call Content delivery type is the same (Mono, Stereo Option A or Stereo Option B) for all the target identities:

the same set of IRI events are sent from ICE to DF2 for each target identity;
the same Content of Communication CC is sent from ICE to DF3 for each target identity.

Furthermore duplication of IRI events and Call Content delivery is a major issue not only due to multiple activations on different identities in one ICE, but also due to the uncorrelated delivery from the multiple ICEs in traffic chain related to the same call/session. This multiple deliveries related to the same call/session (due to multiple monitored identities in single/multiple ICEs) causes that:

- The ICEs are loaded to provide duplicated information, for both IRI and CC monitoring, of the same call related/call unrelated event (e.g. any call attempt is signaled from the multiple ICEs in the traffic chain per each monitored identity . . . );
- Large amount of duplicated and useless data are delivered to the LEMF/Monitoring Centre;
- A large amount of duplicated data could lead to congestion on both X2 and HI2 with possible consequence of capacity wasting for other possible monitoring instances;
- For CS monitoring, the usage of many CC links for delivery the same communication of content could lead to missing monitoring in case of limited number of CC links;
- The duplication of delivered CC is a critical aspect in Packet Switching PS domain, where the amount of delivered CC volumes is usually several order larger than delivered IRIs, even more in case of multiple deliveries of a same CC. The drawback is even worse in case of multiple deliveries to a Law Enforcement Agency from the mediation function in case of multiple ICEs in the traffic chain;
- The LEMF/Monitoring Centre will get a large amount of duplicated information in term of IRI and Content of Communication that requires time and resources to analyze duplicated information.

SUMMARY

The present invention relates to problems how to optimize monitoring capacity in a telecommunication system which capacity depends upon the amount of delivered data. A purpose with the invention is to increase the monitoring capacity. This problem and others are solved by the invention by requesting stop of delivery of duplicate data and instead select only one element for further handling among several received elements related to the same target. An element is equal to Interception Related Information IRI or Content of Communication CC. The solution to the problem is a method for optimizing monitoring capacity in a telecommunication system that comprises at least one Information element receiving unit. The method comprises receiving to the element receiving unit, a one-activity-report-request and a request to monitor a specified target. At least two Information elements related to the specified target are received to the element receiving unit. The information elements are related to the target by different identities and the elements comprise duplicate information. According to the invention, only one element (identity) of the received elements is selected in the element receiving unit for further handling.

According to one aspect of the invention, two Interception Control Elements are acting as information element receiving units. Each Interception Control Element receives Intercept Related Information IRI with duplicate information but with different identities for the same target and Content of Communication CC with duplicate information but with different identities for the same target. Both Interception Control Elements are attached to a first Delivery Function that acts as element receiving unit for Intercept Related Information IRI, and to a second Delivery Function that acts as element receiving unit for Content of Communication CC. The selection of one element (identity) only, for IRI and CC respectively, is performed in two steps, at first in the Interception Control Elements and secondly in the Delivery Functions. The finally selected identities IRI and CC are forwarded to a monitoring unit.

According to another aspect of the invention, two Delivery Functions are acting as information element receiving units. A first Delivery Function receives elements comprising Intercept Related Information IRI with duplicate information but with different identities for the same target and a second Delivery Function receives elements comprising Content of Communication CC with duplicate information but with different identities for the same target. Both Delivery Functions are attached to a monitoring unit. The selection of one information element (identity) only for IRI and CC respectively, is performed in the Delivery Functions. The selected identities IRI and CC are each one forwarded to the monitoring unit.

An object with the invention is to increase monitoring capacity. This object and others are achieved by methods, arrangements, nodes, systems and articles of manufacture.

Some advantages of the invention are as follows:

The invention proposes to stop the delivery of duplicate IRIs and CCs of the same call/session due to multiple monitored identities in single/multiple ICEs.

By the proposed one activity report function, the LEA will not receive useless and duplicated information, so that the analysis of monitoring data will be faster and easier.

In case that the proposed mechanism is deployed also at ICE level, the monitoring capacity of the monitoring system is optimized in terms of the network resource usage (CC links/IO capacity), so decreasing the risk of missing monitoring.

Furthermore, the possibility to have a 2/3 reduction of CC deliveries, keeping the same monitoring capability level, is a clear advantage especially for Packet Switching LI where a large amount of CC is delivered over X3 and HI3 interfaces.

The invention will now be described more in detail with the aid of preferred embodiments in connection with the enclosed drawings.

DETAILED DESCRIPTION

Figure 2:
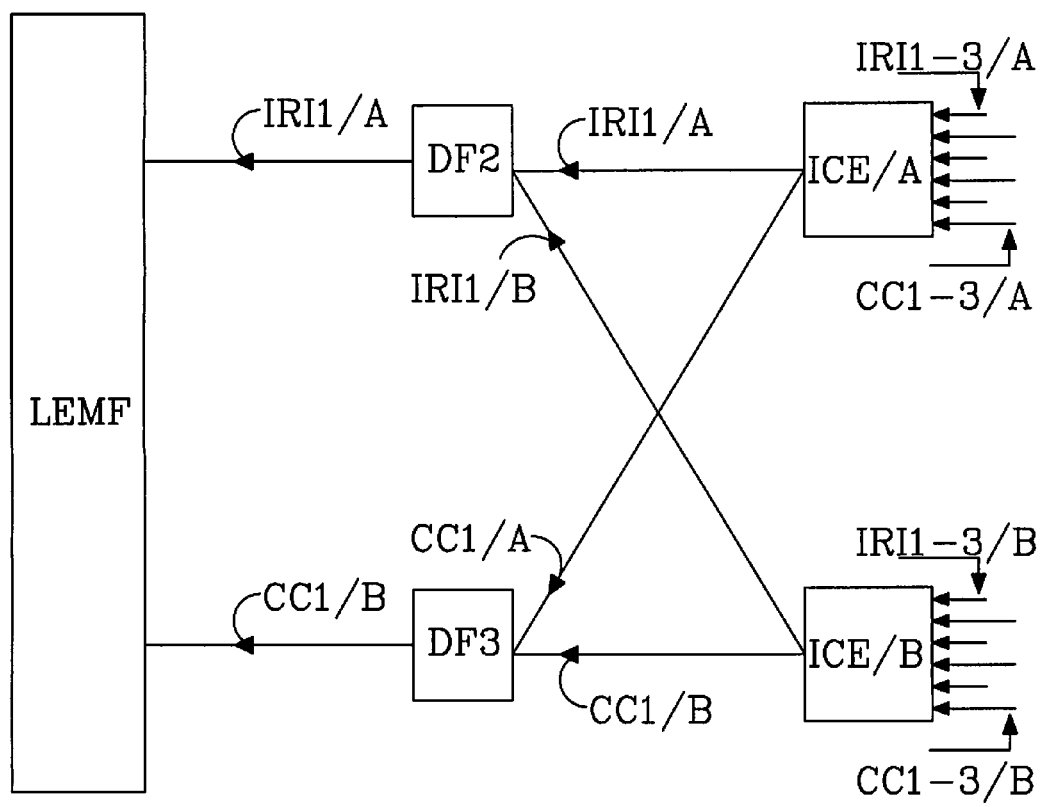
FIG. 2 discloses a block schematic illustration of a monitoring unit attached, via delivery functions, to Intercepting Control Elements acting as information element receiving units.

FIG. 2 discloses two Interception Control Elements ICE/A and ICE/B. In this exemplified embodiment, Interception Control Element ICE/A is a first 3G Mobile Switching Centre and ICE/B is a second 3G Mobile Switching Centre. ICE/A is attached to a Law Enforcement Monitoring Facility LEMF via a first Delivery Function DF2 and also via a second Delivery Function DF3. ICE/B is attached via the first Delivery Function DF2 and via the second Delivery Function DF3 to the Law Enforcement Monitoring Facility LEMF. In a first embodiment of the invention, the two Interception Control Elements are acting as information element receiving units. Each unit receives information elements such as Intercept Related Information IRI having duplicate information but different identities for the same target, and elements such as Content of Communication CC having duplicate information but different identities for the same target. The first Delivery Function DF2 acts as element receiving unit for Intercept Related Information IRI. Intercept Related Information belong to a first element group. The second Delivery Function DF3 acts as element receiving unit for Content of Communication CC. Content of Communication belong to a second element group. The selection of one identity only, for IRI and CC respectively, is performed in two steps, at first in the Interception Control Elements and secondly in the Delivery Functions. The finally selected identities IRI and CC are forwarded to the LEMF.

A pre-requisite for this invention is that certain criteria are fulfilled. The 'minimum' criterion to perform the one activity report is that the monitoring instances refer to the same Law Enforcement Agency LEA and one of them is related to a default identity specified in an ordered priority list. Other criteria, additional to the minimum one, for the one activity report can be very general and can be set by LEMF in the warrant setting (a LEA can possess multiple LEMFs). Examples of such criteria are:
the warrants on the target identities (MSISDN, IMSI and IMEI) have the same Delivery Type (mono/stereo).
and/or the same Monitoring Centre Number MCNB.
and/or the same LEMF.

Figure 1:
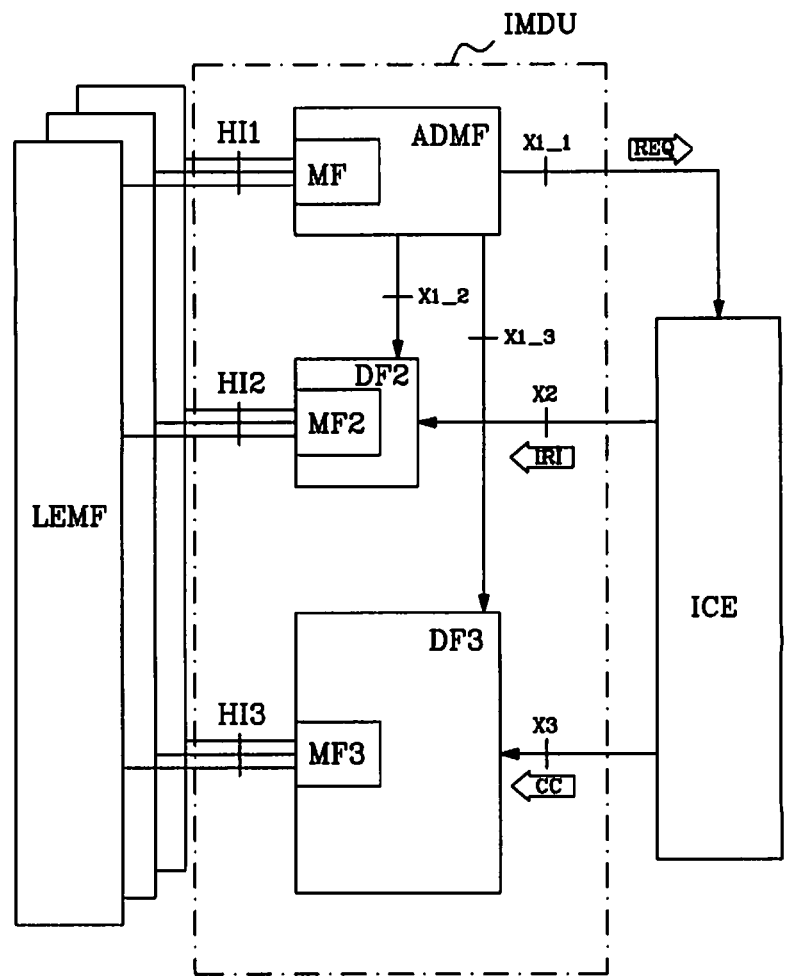
FIG. 1 is part of the prior art and discloses a block schematic illustration of an Intercept Mediation and Delivery Unit attached to an Intercepting Control Element.
Figure 3:
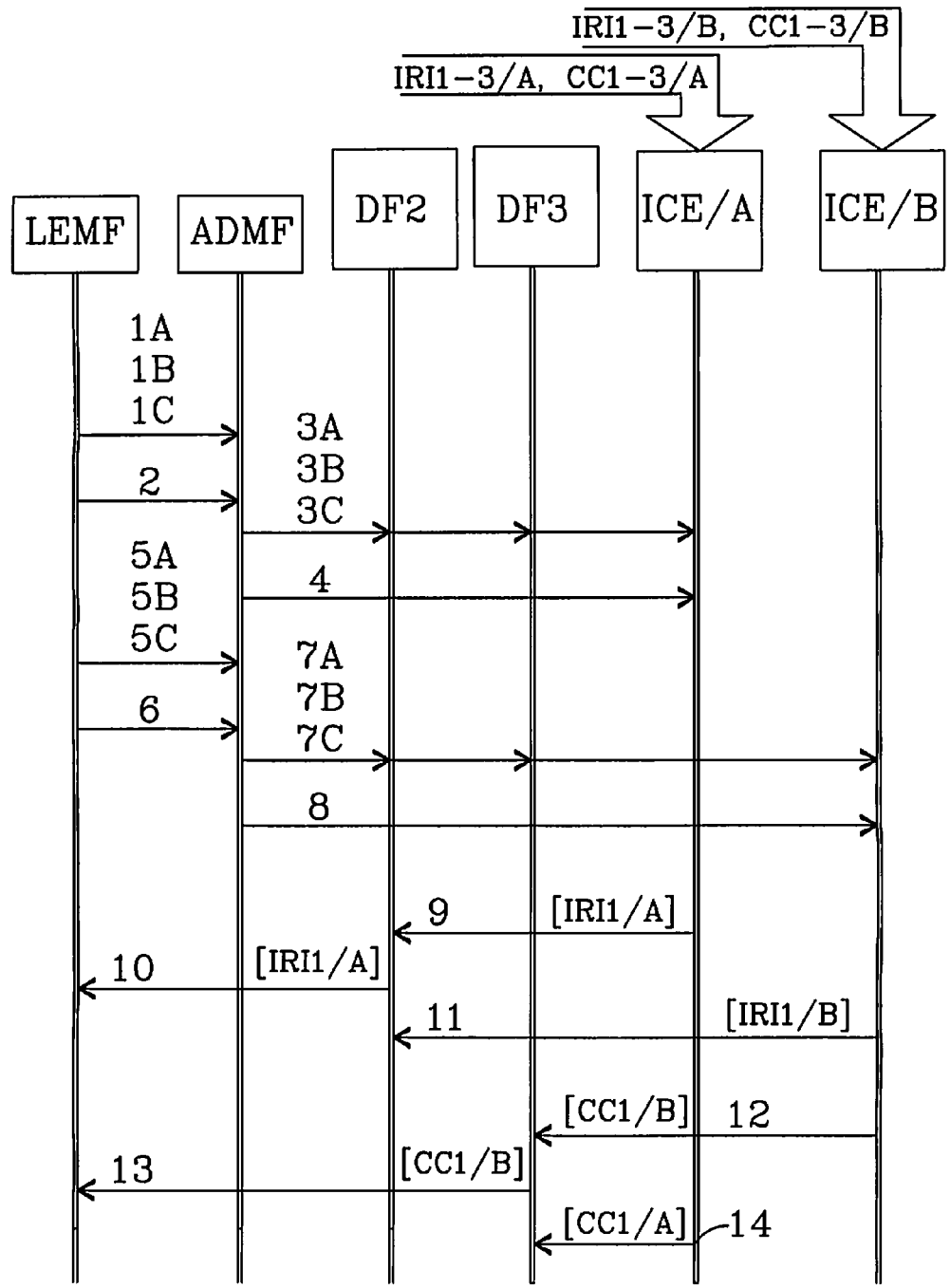
FIG. 3 discloses a signal sequence diagram representing a method for selecting Intercept Related Information and Content of Communication according to a first embodiment of the invention.

A method according to the first embodiment of the invention will now be described more in detail together with FIG. 3. The method comprises the following steps:
A request 1A to perform a one activity report is sent from the Law Enforcement Monitoring Facility LEMF to the Administration Function ADMF. The LEMF requires the one activity report by forwarding to ADMF—The required criteria to perform the one activity report delivery and an identity of a target to be monitored. In the request 1A the target identity is a Mobile Station International ISDN Number MSISDN.
A request 1B to perform a one activity report is sent from the Law Enforcement Monitoring Facility LEMF to the Administration Function ADMF—The LEMF requires the one activity report by forwarding to ADMF, the required criteria to perform the one activity report delivery and an identity of the target. In the request 1B the target identity is an International Mobile Subscriber Identity IMSI.
A request 1C to perform a one activity report is sent from the Law Enforcement Monitoring Facility LEMF to the Administration Function ADMF—The LEMF requires the one activity report by forwarding to ADMF, the required criteria to perform the one activity report delivery and an identity of the target. In the request 1C the target identity is an International Mobile Equipment Identity IMEI.
An ordered priority list is sent from the Law Enforcement Monitoring Facility LEMF to the Administration Function ADMF. As an alternative, the ordered priority list can be sent together with 1A, 1B and 1C. The ordered priority list comprises different identities MSISDN, IMSI and IMEI related to the target. MSISDN is set in the list to be the default identity. The purpose of the list is to secure that for a given intercepted traffic event the one activity report is associated to the default identity. The intercepted traffic event is in this case "call done by the target" (MSISDN, IMSI, IMEI marked for monitoring) but to be noted is that this is just an example out of many possible events.
The information that was sent in the requests 1A, 1B and 1C, are forwarded 3A, 3B and 3C from ADMF to the Interception Control Element ICE/A via the X1_1 interface (see FIG. 1). The ADMF hereby activates in ICE/A the Lawful Intercept triggers on the specified target identity i.e. MSISDN or IMSI or IMEI. The one activity report request and target identities are also transferred to the first Delivery Function DF2 via the X1_2 interface and to the second Delivery Function DF3 via the X1_3 interface (see FIG. 1).
The ordered priority list is forwarded 4 from ADMF to the Interception Control Element ICE/A. Like indicated before, the priority list can be part of 3A, 3B, 3C.
Requests 5A, 5B, 5C comprising criteria to perform the one activity report delivery and identities MSISDN, IMSI and IMEI of the target are sent from LEMF to ADMF. Also the ordered priority list is sent 6 from the Law Enforcement Monitoring Facility LEMF to the Administration Function ADMF.
The requests 5A, 5B and 5C are forwarded 7A, 7B and 7C from ADMF to an Interception Control Element ICE/B. The ADMF hereby activates in ICE/B the Lawful Intercept triggers on the specified target identity i.e. MSISDN or IMSI or IMEI. The intercepted traffic event is the same as above. Like before, the one activity report request and target identities is transferred to the first Delivery Function DF2 via the X1_2 interface and transferred to the second Delivery Function DF3 via the X1_3 interface.
The ordered priority list is forwarded 8 from ADMF to the Interception Control Element ICE/B.
The target provokes the intercepted traffic event, in this example by a call done from the target subscriber.
As can be seen in FIG. 3, duplicated Intercept Related Information elements IRI1-3/A and duplicated Content of Communication elements CC1-3/A enters ICE/A when the target provokes the intercepted traffic event. In total the following elements enter ICE/A:
IRI1/A; Corresponds to an IRI element related to the target when identified in ICE/A with MSISDN.
IRI2/A; Corresponds to an IRI element with the same information as IRI1/A. IRI2/A is related to the target when identified in ICE/A with IMSI.
IRI3/A; Corresponds to an IRI element with the same information as IRI1/A. IRI3/A is related to the target when identified in ICE/A with IMEI.
CC1/A; Corresponds to a CC element related to the target when identified in ICE/A with MSISDN.

CC2/A; Corresponds to a CC element with the same information as CC1/A. CC2/A is related to the target when identified in ICE/A with IMSI.

CC3/A; Corresponds to a CC element with the same information as CC1/A. CC3/A is related to the target when identified in ICE/A with IMEI.

According to invention, since the one activity report and the ordered priority list related to the target was delivered to ICE/A, the ICE/A selects the default identity of the received identities. MSISDN was in this example set in the list to be the default identity and the Intercept Related Information element IRI1/A identifying the target in ICE/A with MSISDN is selected. The Intercept Related Information elements IRI2/A and IRI3/A identifying the target in ICE/A with IMSI and IMEI are discarded.

The selected Intercept Related Information element IRI1/A is forwarded 9 from ICE/A to the first Delivery Function DF2.

As already mentioned, the one activity report criteria was transferred to the first Delivery Function DF2 and the Intercept Related Information element IRI1/A identifying the target with MSISDN is forwarded 10 from DF2 to the Law Enforcement Monitoring Facility LEMF.

Duplicated Intercept Related Information elements IRI1-3/B and duplicated Content of Communication elements CC1-3/B occur in ICE/B when the target provokes the intercepted traffic event. In total the following elements enter ICE/B:

IRI1/B; Corresponds to an IRI element related to the target when identified in ICE/B with MSISDN. IRI1/B comprises duplicate information to IRI1/A.

IRI2/B; Corresponds to an IRI element with the same information as IRI1/B. IRI2/B is related to the target when identified in ICE/B with IMSI.

IRI3/B; Corresponds to an IRI element with the same information as IRI1/B. IRI3/B is related to the target when identified in ICE/B with IMEI.

CC1/B; Corresponds to a CC element related to the target when identified in ICE/B with MSISDN. CC1/B comprises duplicate information to CC1/A.

CC2/B; Corresponds to a CC element with the same information as CC1/B. CC2/B is related to the target when identified in ICE/B with IMSI.

CC3/B; Corresponds to a CC element with the same information as CC1/B. CC3/B is related to the target when identified in ICE/B with IMEI.

Since the one activity report and the ordered priority list related to the target were delivered to ICE/B, the ICE/B selects the default identity of the received identities. MSISDN was set in the list to be the default identity and the Intercept Related Information element IRI1/B identifying the target with MSISDN is selected. The IRI2/B and IRI3/B identifying the target in ICE/B with IMSI and IMEI are discarded.

The selected Intercept Related Information element IRI1/B is forwarded 11 from ICE/B to the first Delivery Function DF2.

IRI1/B is recognized to be a duplicate of IRI1/A, and IRI1/B is discarded.

In a similar way as described above, according to invention, the ICE/B selects the Content of Communication elements CC1/B related to the target and identified in ICE/B with MSISDN. CC2/B and CC3/B are discarded.

The selected Content of Communication elements CC1/B is forwarded 12 from ICE/B to the second Delivery Function DF3.

Like above, the one activity report criteria was transferred to the DF3 and the CC element CC1/B identifying the target with MSISDN is forwarded 13 from DF3 to the Law Enforcement Monitoring Facility LEMF.

The ICE/A selects the Content of Communication elements CC1/A related to the target and identified in ICE/A with MSISDN. CC2/A and CC3/A are discarded.

The selected Content of Communication elements CC1/A is forwarded 14 from ICE/A to the second Delivery Function DF3.

CC1/A is recognized to be a duplicate of CC1/B, and CC1/A is discarded in DF2.

Instead of applying the invention to both IRI and CC elements as shown in the above embodiment it is possible to apply the invention for IRI or CC only. In case only CC elements are to be selected, the Content of Communication CC will belong to the first element group (when the terminology in the embodiment above is used). The method steps relative position is of minor importance for the invention, for example, first select CC and then IRI is also possible within the scope of the invention. If so, CC will belong to the first element group and the IRI will belong to the second element group.

Figure 4:
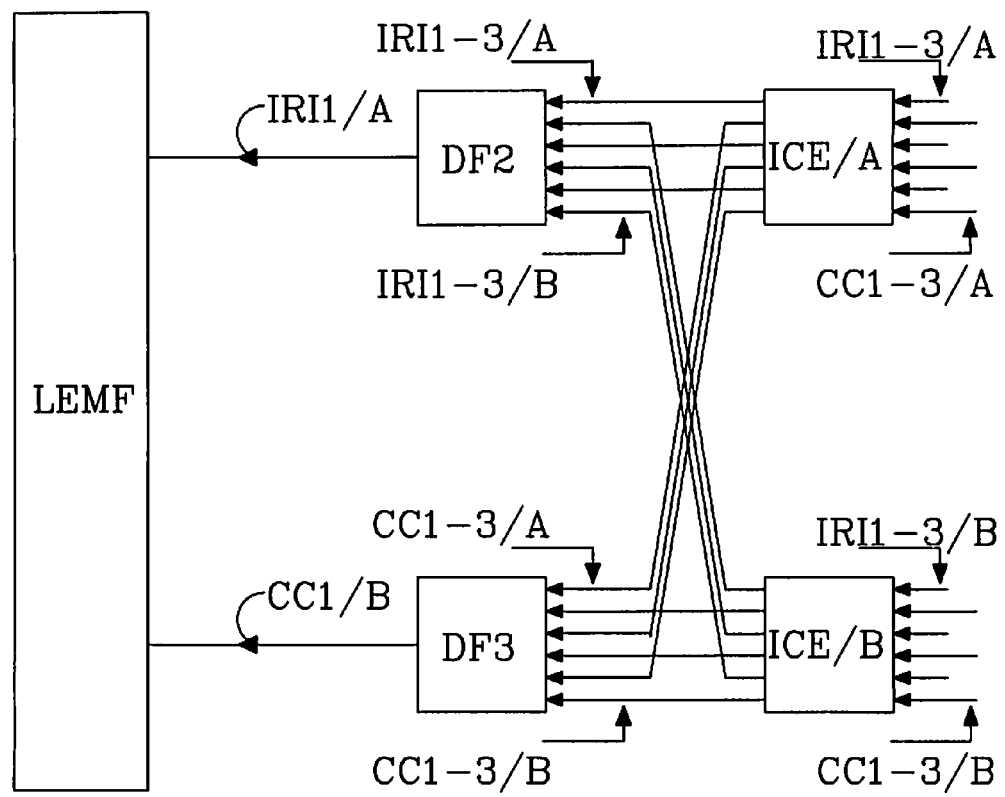
FIG. 4 discloses a block schematic illustration of a monitoring unit attached to Interception Control Elements via delivery functions acting as information element receiving units.

FIG. 4 discloses the same entities as was shown and has been explained together with FIG. 2. In a second embodiment of the invention, the two Interception Control Elements are acting as information element receiving units. Each unit receives elements such as Intercept Related Information IRI, and Content of Communication CC having duplicate information but with different identities for the same target. The first Delivery Function DF2 acts as identity receiving unit for Intercept Related Information IRI. The second Delivery Function DF3 acts as identity receiving unit for Content of Communication CC. The selection of one element (identity) only, for IRI and CC respectively, is in this embodiment performed in one step i.e. in the Delivery Functions. The finally selected elements IRI and CC are forwarded to the LEMF.

Figure 5:
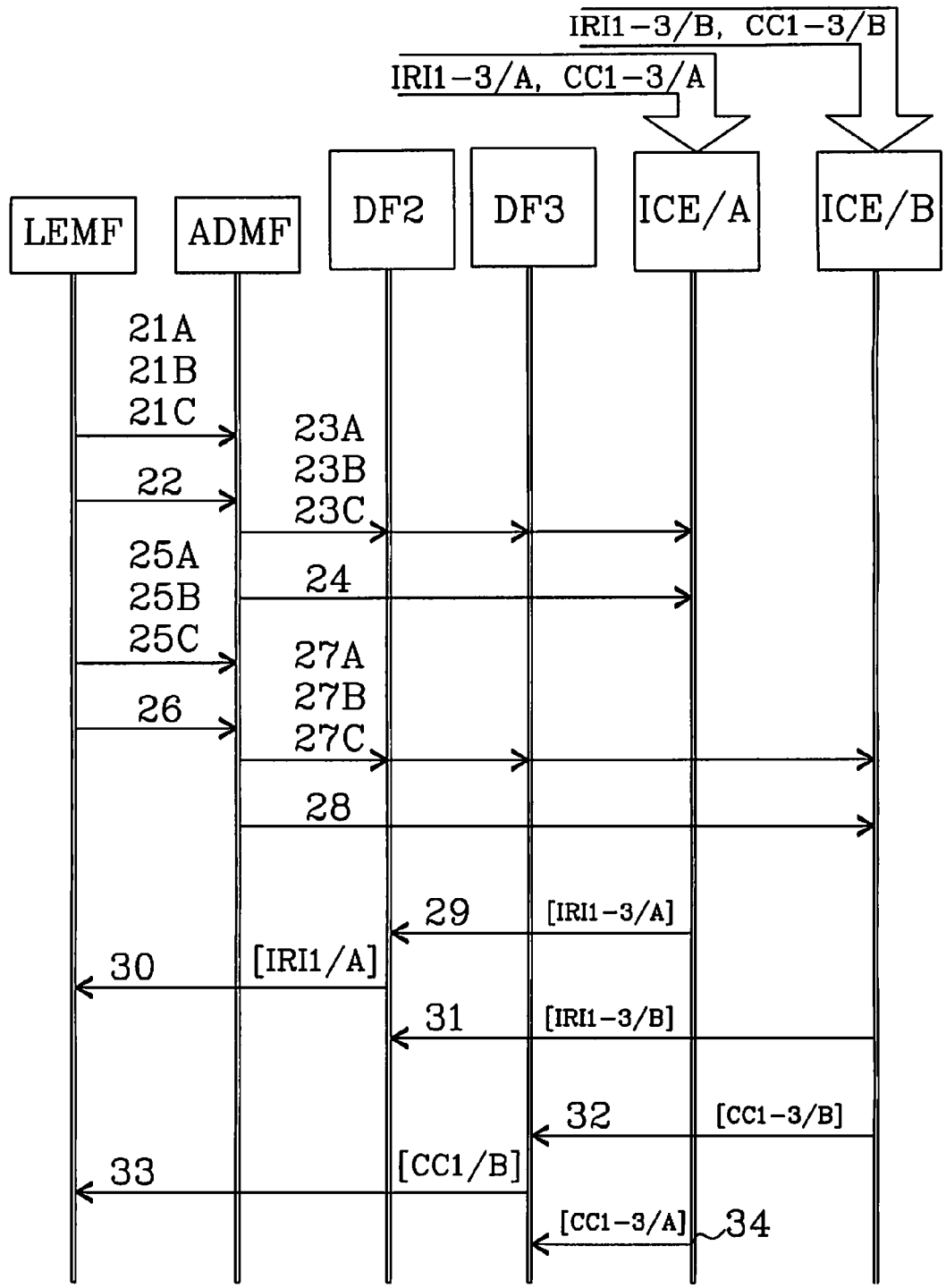
FIG. 5 discloses a signal sequence diagram representing a method for selecting Intercept Related Information and Content of Communication according to a second embodiment of the invention.

A method according to the second embodiment of the invention will now be described together with FIG. 5. The method according to the second embodiment is in many parts similar to the method in the first embodiment. The method comprises the following steps:

Requests 21A-21C to perform a one activity report are sent from the Law Enforcement Monitoring Facility LEMF to the Administration Function ADMF. The LEMF requires the one activity report by forwarding to ADMF—The required criteria to perform the one activity report delivery and an identity of a target to be monitored. In the requests 21A-21C the target identities are MSISDN, IMSI and IMEI respectively.

An ordered priority list is sent 22 from the LEMF to the ADMF.

The information that was sent in the requests 21A-21C are forwarded 23A-23C from ADMF to the Interception Control Element ICE/A via the X1_1 interface. The ADMF hereby activates in ICE/A the Lawful Intercept triggers on the specified target identity i.e. MSISDN or IMSI or IMEI. The one activity report request and target identities are transferred to the first Delivery Function DF2 via the X1_2 interface and to the second Delivery Function DF3 via the X1_3 interface.

The ordered priority list is forwarded 24 from ADMF to the Interception Control Element ICE/A.

Requests 25A, 25B, 25C comprising criteria to perform the one activity report delivery and identities MSISDN, IMSI and IMEI of the target are sent from LEMF to ADMF. Also the ordered priority list is sent 26 from the Law Enforcement Monitoring Facility LEMF to the Administration Function ADMF.

The information that was sent in the requests 25A-25C is forwarded 27A-27C from ADMF to the Interception Control Element ICE/B via the X1_1 interface. The ADMF hereby activates in ICE/B the Lawful Intercept triggers on the specified target identity i.e. MSISDN or IMSI or IMEI. The one activity report request and target identities are transferred to DF2 and DF3 in the same way as described above.

The ordered priority list is forwarded 28 from ADMF to the Interception Control Element ICE/B.

The target provokes the intercepted traffic event.

Duplicated Intercept Related Information elements and duplicated Content of Communication elements enters ICE/A and ICE/B.

Since the target is set to be monitored, the ICE/A and ICE/B both forward IRI related to the target, to DF2 and CC related to the target, to DF3. IRI1-3/A are forwarded 29 from ICE/A to the first Delivery Function DF2 and IRI1-3/B are forwarded 31 from ICE/B to the first Delivery Function DF2. CC1-3/B are forwarded 32 from ICE/B to the second Delivery Function DF3 and C1-3/A are forwarded 34 from ICE/A to the second Delivery Function DF3.

When receiving IRI1-3/A to the first Delivery Function DF2, DF2 forwards 30 the Intercept Related Information element IRI1/A identifying the target with MSISDN to the Law Enforcement Monitoring Facility LEMF. IRI2/A and IRI3/A are discarded. Subsequent, when receiving IRI1-3/B to the first Delivery Function DF2, IRI1-3/B will all be discarded.

When receiving CC1-3/B to the second Delivery Function DF3, DF3 forwards 33 the Content of Communication element CC1/B identifying the target with MSISDN to the Law Enforcement Monitoring Facility LEMF. CC2/B and CC3/B are discarded. Subsequent, when receiving CC1-3/A to the second Delivery Function DF3, CC1-3/A will all be discarded.

Figure 6:
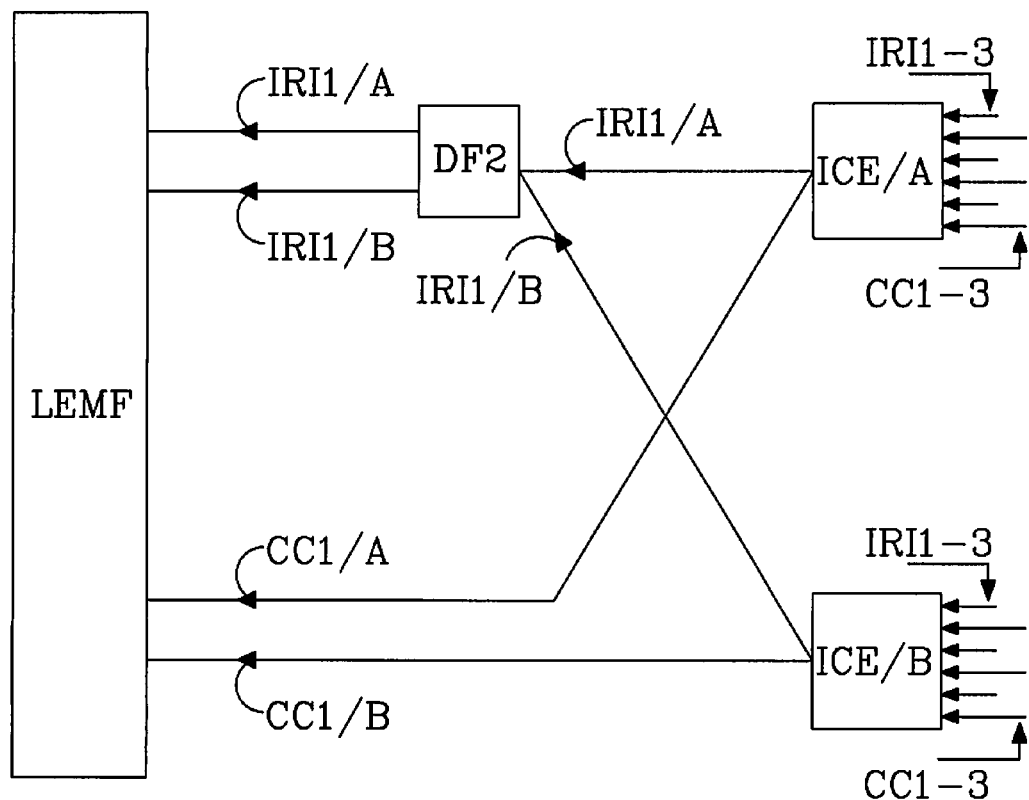
FIG. 6 discloses a block schematic illustration of a monitoring unit attached to two Interception Control Elements acting as information element receiving units. The block schematic illustration in FIG. 6 is related to Circuit Switching.

The invention is not limited to the above described and in previous figures shown embodiments but can be modified within the scope of the claims. For example, FIG. 6 discloses the same entities as has been shown and explained earlier in the application together with FIGS. 2 and 4. FIG. 6 discloses signalling corresponding to the first embodiment when the signalling is performed in a Circuit Switching domain. As can be seen in FIG. 6, in Circuit Switching, DF2 receives IRI while DF3 only handles call control. The speech (call content monitoring) is in this example sent directly to the LEMF. In this case, the one activity report has to be done in the ICEs only (compare with the first embodiment). The final IRI can either be selected in DF2 as in the first embodiment or duplicate IRIs can be sent transparently via DF2 to LEMF as is shown in FIG. 6. Also other variations are possible within the scope of the invention.

Figure 7:
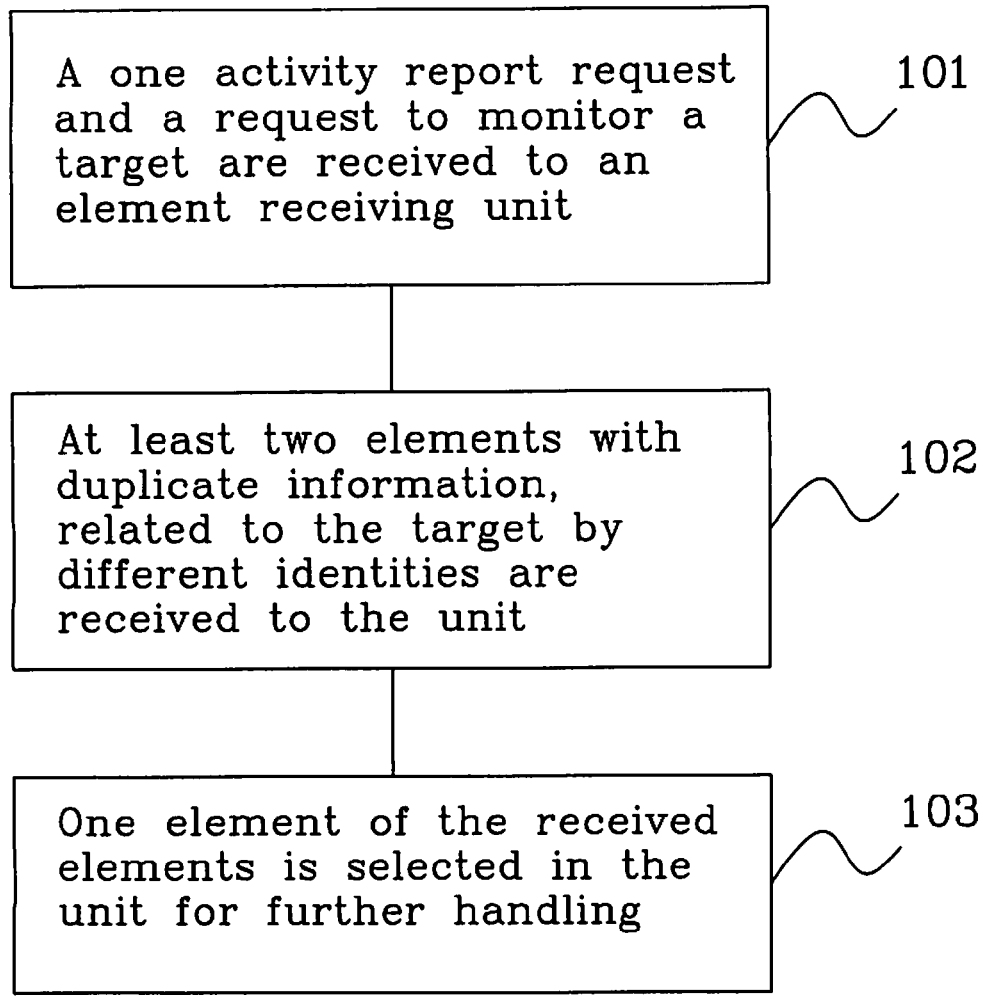
FIG. 7 discloses a flow chart illustrating some essential method steps of the invention.

FIG. 7 discloses a flow chart illustrating some essential method steps of the invention. The flow chart is to be read together with the earlier shown figures. The flow chart comprises the following steps:

A one activity report request and a request to monitor a specified target is received to an element receiving unit. This step is shown in the figure with a block 101.

At least two information elements that belong to a first element group, which elements are related to the target by different identities and which elements comprise duplicate information are received to the element receiving unit. This step is shown in the figure with a block 102.

One element of the received at least two elements is selected in the element receiving unit. This step is shown in the figure with a block 103.

Figure 8:
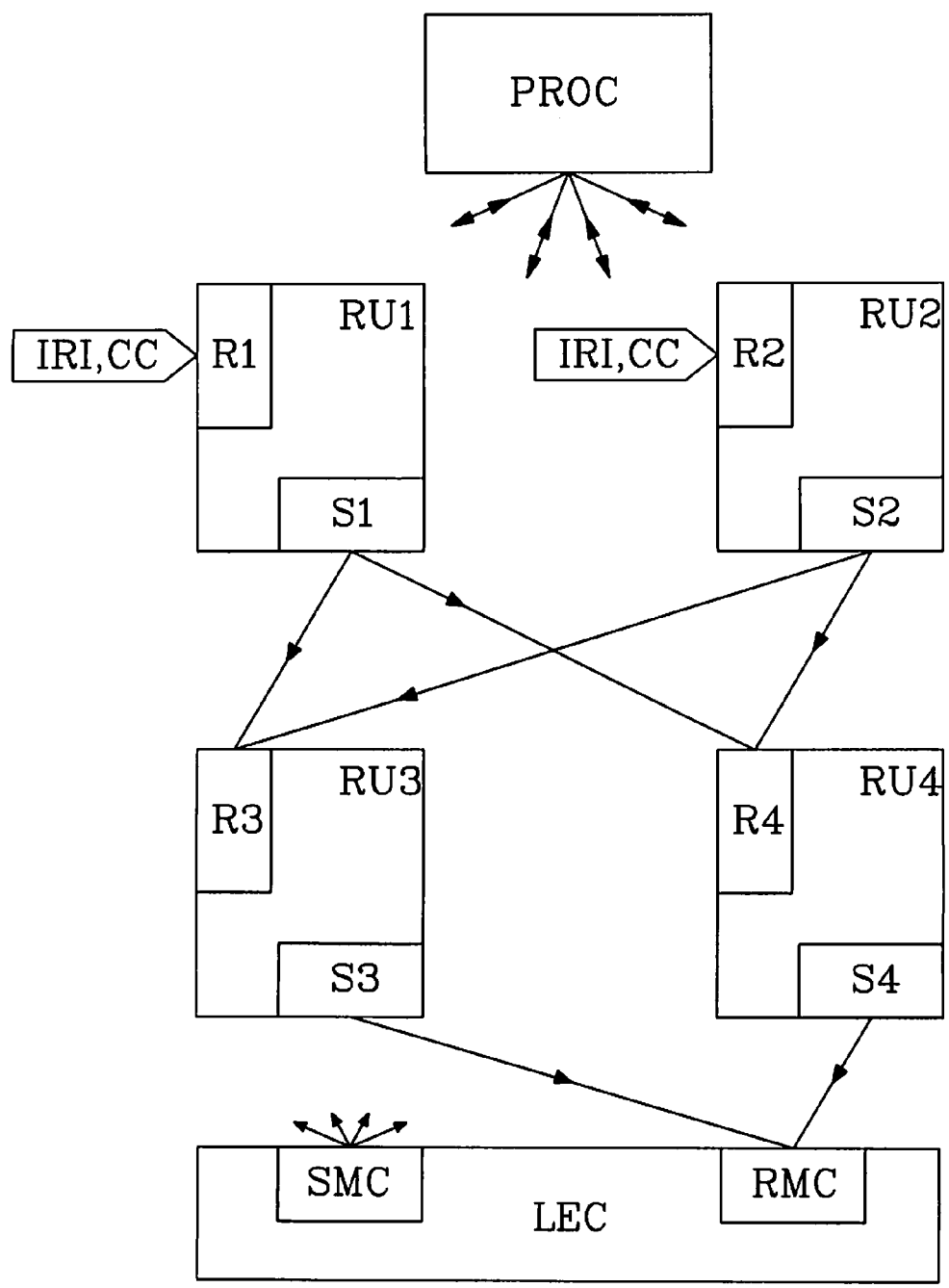
FIG. 8 schematically discloses a system that can be used to put the invention into practice.

A system that can be used to put the invention into practice is schematically shown in FIG. 8. The block schematic constellation corresponds in many parts to the ones disclosed in FIGS. 2, 4 and 6. Four Receiving Units RU1-RU4, each unit comprising a receiver R1-R4 and a sender S1-S4, can be seen in the figure. A Law Enforcement centre LEC is responsible for sending out from a sender SMS to Receiving Units, a one activity report, identities of a target to be monitored and an ordered priority list. The LEC receives selected elements from receiving units via a receiver RMC. A processor unit PROC is used for control of the Receiving Units. PROC can be an external unit located outside the R1-R4 or and internal unit located within each R1-R4. The processor unit is responsible for the handling of received information like IRI and CC and also the one activity report, target identities and the ordered priority list. By aid of obtained information, the processor unit selects in the receiving units, information elements that are to be further handled and forwarded from the senders in the Receiving Units.

Enumerated items are shown in the figure as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The invention is not limited to the above described and in the drawings shown embodiments but can be modified within the scope of the enclosed claims. The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multifunction hardware. Processing functions may be implemented using a programmed microprocessor or general-purpose computer. The invention is not limited to the above described and in the drawings shown embodiments but can be modified within the scope of the enclosed claims.

The invention claimed is:

1. A method for optimizing monitoring capacity in a telecommunication system comprising at least one information element receiving unit, the method comprising the following steps:

receiving at a first element receiving unit, a one activity report request and a list of identities of a target to be monitored, the list associating the identities with the target to be monitored;

activating lawful intercept triggers on each of the received identities;

receiving at the first element receiving unit at least two information elements that belong to a first element group, each of the at least two information elements being related to the target by a different one of the identities and comprising duplicate information;

selecting in the first element receiving unit a single one of the received at least two information elements when multiple identities of the target are available for monitoring; and forwarding the selected one of the information elements to a monitoring unit.

2. The method of claim 1 further comprising the steps of:

receiving at the first element receiving unit at least two information elements that belong to a second element group, each of the at least two information elements that belong to the second element group being related to the target by a different one of the identities and comprising duplicate information; and selecting in the first element receiving unit a single one of the received at least two information elements that belong to the second element group.

3. The method of claim 2, wherein the telecommunication system comprises at least two element receiving units, further comprising the steps of:

receiving at a second element receiving unit, the one activity report request and the list of identities of the target to be monitored;

receiving at the second element receiving unit another at least two information elements that belong to the first element group, each of the another at least two information elements that belong to the first element group being related to the target by a different one of the identities and comprising duplicate information; and selecting in the second element receiving unit a single one of the received another at least two information elements belong to the first element group;

sending the selected one of the at least two information elements and the selected one of the another at least two information elements that belong to the first element group from the first and second element receiving units to a first Delivery Function adapted to receive Intercept Related Information;

selecting in the first Delivery Function a single one of the received first and second selected information elements that belong to the first element group;

forwarding the selected one of the received first and second selected information elements that belong to the first element group from the first Delivery Function to the monitoring unit;

receiving at the second element receiving unit another at least two information elements that belong to the second element group, each of the another at least two information elements that belong to the second element group being related to the target by a different one of the identities and comprising duplicate information; and selecting in the second element receiving unit a single one of the received another at least two information elements that belong to the second element group;

sending the selected one of the at least two information elements and the selected one of the another at least two information elements that belong to the second element group from the first and second element receiving units to a second Delivery Function adapted to receive Content of Communication;

selecting in the second delivery Function a single one of the received first and second selected information elements that belong to the second element group; and forwarding the selected one of the received first and second selected information elements that belong to the second element group from the second Delivery Function to the monitoring unit.

4. The method of claim 2, further comprising the steps of:

receiving at a second element receiving unit, the one activity report request and the plurality of identities associated with the target to be monitored;

receiving at the second element receiving unit another at least two information elements that belong to the first element group, each of the another at least two information elements being related to the target by a different one of the identities and comprising duplicate information; and selecting in the second element receiving unit a single one of the received another at least two information elements;

sending the selected one of the at least two information elements belonging to the first element group and the selected one of the another at least two information elements belonging to the first element group from the first and second element receiving units, respectively, to a first Delivery Function adapted to receive Intercept Related Information;

forwarding the selected one of the received first and second selected information elements from the first Delivery Function to the monitoring unit;

receiving at the second element receiving unit another at least two information elements that belong to the second element group, each of the another at least two information elements that belong to the second element group being related to the target by a different one of the identities and comprising duplicate information; and selecting in the second element receiving unit a single one of the received another at least two information elements that belong to the second element group; and sending the selected one of the at least two information elements belonging to the second element group and the selected one of the another at least two information elements belonging to the second element group from the first and second element receiving units, respectively, to the monitoring unit.

5. The method of claim 1 wherein the list of identities is an ordered priority list comprising a default identity, wherein the selected information element is related to the default identity.

6. The method of claim 1, further comprising the steps of:

receiving at a second element receiving unit, the one activity report request and the list of identities of the target to be monitored;

receiving at the second element receiving unit another at least two information elements that belong to the first element group, each of the another at least two other information elements being related to the target by a different one of the identities and comprising duplicate information; and selecting in the second element receiving unit a single one of the received another at least two information elements;

sending the selected one of the at least two information elements and the selected one of the another at least two information elements that belong to the first element group from the first and second element receiving units, respectively, to the first Delivery Function;
selecting in the first Delivery Function a single one of the received first and second selected information elements; and
forwarding the selected one of the received first and second selected information elements from the first Delivery Function to the monitoring unit.

7. The method of claim 1, wherein the first element receiving unit is a Delivery Function and the at least two information elements are received from at least one Intercepting Control Element.

8. The method of claim 7 wherein the Delivery Function is adapted to receive information elements comprising Intercept Related Information.

9. The method of claim 7 wherein the Delivery Function is adapted to receive information elements comprising Content of Communication.

10. The method according to claim 1, the at least two information elements being Circuit Switched related, the method further comprising the steps of:
receiving at a second element receiving unit, the one activity report request and the plurality of identities associated with the target to be monitored;
receiving at the second element receiving unit another at least two information elements that belong to the first element group and that are Circuit Switched related, each of the another at least two information elements being related to the target by a different one of the identities and comprising duplicate information; and
selecting in the second element receiving unit a single one of the received another at least two information elements;
sending the selected one of the at least two information elements and the selected one of the another at least two information elements from the first and second element receiving units, respectively, to a first Delivery Function adapted to receive Intercept Related Information; and
forwarding the selected one of the at least two information elements and the selected one of the another at least two information elements from the first Delivery Function to the monitoring unit.

11. An arrangement suitable for optimizing monitoring capacity in a telecommunication system comprising at least one information element receiving unit, the arrangement comprising:
a first element receiving unit comprising a processor and a memory containing instructions that, when executed by the processor, cause the first element receiving unit to:
receive a one activity report request and a list of identities of a target to be monitored, the list associating the identities with the target to be monitored;
in response to lawful intercept triggers being activated on each of the received identities, receive at least two information elements that belong to a first element group, each of the at least two information elements being related to the target by a different one of the identities and comprising duplicate information;
select a single one of the received at least two information elements when multiple identities of the target are available for monitoring; and
forward the selected one of the information elements to a monitoring unit.

12. The arrangement of claim 11, wherein the first element receiving unit is further arranged to:
receive at least two information elements that belong to a second element group, each of the at least two information elements that belong to the second element group being related to the target by a different one of the identities and comprising duplicate information; and
select a single one of the received at least two information elements that belong to the second element group to be forwarded.

13. The arrangement of claim 12, further comprising:
a first Delivery Function adapted to receive Intercept Related Information;
a second Delivery Function adapted to receive Content of Communication, wherein the first element receiving unit is further arranged to:
send the selected one of the at least two information elements that belong to the first element group to the first Delivery Function; and
send the selected one of the at least two information elements that belong to the second element group to the second Delivery Function; and
a second element receiving unit arranged to:
receive the one activity report request and the list of identities of the target to be monitored;
receive another at least two information elements that belong to the first element group, each of the another at least two information elements being related to the target by a different one of the identities and comprising duplicate information;
select a single one of the received another at least two information elements belonging to the first element group;
send the selected one of the another at least two information elements belonging to the first element group to the first Delivery Function;
receive another at least two information elements that belong to the second element group, each of the another at least two information elements being related to the target by a different one of the identities and comprising duplicate information;
select a single one of the received another at least two information elements belonging to the second element group;
send the selected one of the another at least two information elements belonging to the second element group to the second Delivery Function;
wherein the first Delivery Function is arranged to select a single one of the first and second selected information elements that belong to the first element group and to forward the selected one of the first and second selected information elements that belong to the first element group to the monitoring unit, and
wherein the second Delivery Function is arranged to select a single one of the first and second selected information elements that belong to the first element group and to forward the selected one of the first and second selected information elements that belong to the second element group to the monitoring unit.

14. The arrangement of claim 12, further comprising:
a first Delivery Function adapted to receive Intercept Related Information, wherein the first element receiving unit is further arranged to send the selected one of the at least two information elements that belong to the first element group to the first Delivery Function;
a second element receiving unit arranged to:
receive the one activity report request and the list of identities of the target to be monitored;
receive another at least two information elements that belong to the first element group, each of the another at least two information elements being related to the target by a different one of the identities and comprising duplicate information;

select a single one of the received another at least two information elements belonging to the first element group;

send the selected one of the another at least two information elements belonging to the first element group to the first Delivery Function;

receive another at least two information elements that belong to the second element group, each of the another at least two information elements being related to the target by a different one of the identities and comprising duplicate information;

select a single one of the received another at least two information elements belonging to the second element group;

wherein the first Delivery Function is arranged to forward the selected one of the at least two information elements belonging to the first element group and the selected one of the another at least two information elements belonging to the first element group to the monitoring unit, and wherein the first and second element receiving units are arranged to send, respectively, the selected one of the at least two information elements belonging to the second element group and the selected one of the another at least two information elements belonging to the second element group to the monitoring unit.

15. The arrangement of claim 11, wherein the list of identities is an ordered priority list comprising a default identity, wherein the selected information element is related to the default identity.

16. The arrangement of claim 11, further comprising: a first Delivery Function, wherein the first element receiving unit is further arranged to send the selected one of the at least two information elements that belong to the first element group to the first Delivery Function; and a second element receiving unit arranged to:

receive the one activity report request and the plurality of identities associated with the target to be monitored;

in response to the lawful intercept triggers being activated on each of the received identities, receive another at least two information elements that belong to the first element group, each of the another at least two information elements being related to the target by a different one of the identities and comprising duplicate information;

select a single one of the received another at least two information elements; and send the selected one of the another at least two information elements to the first Delivery Function, wherein the first Delivery Function is arranged to select a single one of the first and second selected information elements and to forward the selected one of the first and second selected information elements to the monitoring unit.

17. The arrangement of claim 11, wherein the element receiving unit is a Delivery Function and the at least two information elements are received from at least one Intercepting Control Element, wherein the selected information element is forwarded to the monitoring unit.

18. The arrangement of claim 17, wherein the Delivery Function is adapted to receive information elements comprising Intercept Related Information.

19. The arrangement of claim 17, wherein the Delivery Function is adapted to receive information elements comprising Content of Communication.

20. The arrangement of claim 11, further comprising:

a first Delivery Function adapted to receive Intercept Related Information, wherein the first element receiving unit is further arranged to send the selected one of the at least two information elements that belong to the first element group to the first Delivery Function; and a second element receiving unit arranged to:

receive the one activity report request and the list of identities of the target to be monitored;

receive another at least two information elements that belong to the first element group and that are Circuit Switched related, each of the another at least two information elements being related to the target by a different one of the identities and comprising duplicate information;

select a single one of the received another at least two information elements; and send the selected one of the another at least two information elements to the first Delivery Function, wherein the first Delivery Function is arranged to forward the selected one of the at least two information elements and the selected one of the another at least two information elements to the monitoring unit.

* * * * *

UNITED STATES PATENT AND TRADEMARK OFFICE
CERTIFICATE OF CORRECTION

| | | |
|---|---|---|
| PATENT NO. | : 8,903,988 B2 | Page 1 of 1 |
| APPLICATION NO. | : 12/936257 | |
| DATED | : December 2, 2014 | |
| INVENTOR(S) | : Di Donato et al. | |

It is certified that error appears in the above-identified patent and that said Letters Patent is hereby corrected as shown below:

On the title page, item (57), Line 4, delete "One" and insert -- A one --, therefor.

In the specification

Column 5, Line 44, delete "(mono/stereo)." and insert -- (mono/stereo) --, therefor.

Column 5, Line 45, delete "MCNB." and insert -- MCNB --, therefor.

Column 10, Line 18, delete "and" and insert -- an --, therefor.

Signed and Sealed this
Sixth Day of October, 2015

Michelle K. Lee
*Director of the United States Patent and Trademark Office*